US011605233B2

(12) United States Patent
Stenneth et al.

(10) Patent No.: US 11,605,233 B2
(45) Date of Patent: Mar. 14, 2023

(54) APPARATUS AND METHODS FOR DETERMINING STATE OF VISIBILITY FOR A ROAD OBJECT IN REAL TIME

(71) Applicant: HERE GLOBAL B.V., Eindhoven (NL)

(72) Inventors: Leon Stenneth, Chicago, IL (US); Jerome Beaurepaire, Berlin (DE); Jeremy Young, Chicago, IL (US)

(73) Assignee: HERE GLOBAL B.V., Eindhoven (NL)

(*) Notice: Subject to any disclaimer, the term of this patent is extended or adjusted under 35 U.S.C. 154(b) by 0 days.

(21) Appl. No.: 17/337,926

(22) Filed: Jun. 3, 2021

(65) Prior Publication Data
US 2022/0391624 A1 Dec. 8, 2022

(51) Int. Cl.
H04L 67/12 (2022.01)
B60R 11/04 (2006.01)
B60R 1/00 (2022.01)
G06V 20/58 (2022.01)
B60S 1/08 (2006.01)
G01C 21/00 (2006.01)
G06V 10/98 (2022.01)

(52) U.S. Cl.
CPC .......... G06V 20/582 (2022.01); B60S 1/0844 (2013.01); G01C 21/3815 (2020.08); G06V 10/993 (2022.01); G06V 2201/08 (2022.01)

(58) Field of Classification Search
None
See application file for complete search history.

(56) References Cited

U.S. PATENT DOCUMENTS

| 6,442,473 | B1 | 8/2002 | Berstis et al. |
| 10,493,986 | B2 | 12/2019 | Ratcliffe |
| 10,762,365 | B2* | 9/2020 | Ewert ............... G06K 9/00818 |
| 10,870,351 | B2 | 12/2020 | Viswanathan |
| 2020/0211385 | A1* | 7/2020 | Johnson ........... G08G 1/096708 |
| 2020/0349368 | A1* | 11/2020 | Mayster ............ G01C 21/3644 |

FOREIGN PATENT DOCUMENTS

| DE | 102012213485 A1 | 2/2014 |
| WO | 2021005073 A1 | 1/2021 |

OTHER PUBLICATIONS

Andrzej Ruta et al. In-vehicle camera traffic sign detection and recognition, Machine Vision and Applications (Mach Vis Appl), Dec. 3, 2009.

* cited by examiner

Primary Examiner — Samuel D Fereja
(74) Attorney, Agent, or Firm — Peter H. Yu; Here Global B.V.

(57) ABSTRACT

An apparatus, method and computer program product are provided for determining a state of visibility of a road object, such as a road sign, using vehicle sensor data. For example, the apparatus determines whether one or more sensors of a first vehicle observes a road sign. If the road sign is not observed by the one or more sensors, the apparatus determines whether one or more second vehicles is obscuring the road sign. If the one or more second vehicles is not obscuring the road sign, the apparatus determines whether the road sign is obscured due to a weather condition. If the road sign is obscured due to the weather condition, the apparatus generates a signal indicating that the road sign was obscured due to the weather condition.

15 Claims, 10 Drawing Sheets

APPARATUS AND METHODS FOR DETERMINING STATE OF VISIBILITY FOR A ROAD OBJECT IN REAL TIME

TECHNICAL FIELD

The present disclosure generally relates to the field of mapping, associated methods and apparatus, and in particular concerns, for example, an apparatus configured to determine a state of visibility for a road object, such as a road sign, in real time using vehicle sensor data.

BACKGROUND

Modern vehicles may be equipped with cameras for identifying sign information presented by a road sign. When the vehicles encounter the road sign, the vehicles generate a message indicating whether the cameras have observed the road sign and transmit the message to a map server. Using the message, the map server may update one or more attributes associated with the road sign. For example, if the message indicates that the road sign was observed, the map server may update the database thereof to specify that the road sign was recently observed and that attribute data associated with the road sign is accurate. In an event where the sign information is obscured, the map server may incorrectly update the database by removing the road sign from a map.

The listing or discussion of a prior-published document or any background in this specification should not necessarily be taken as an acknowledgement that the document or background is part of the state of the art or is common general knowledge.

BRIEF SUMMARY

According to a first aspect, an apparatus includes at least one processor and at least one non-transitory memory including computer program code instructions. The computer program code instructions, when executed, cause the apparatus to determine whether one or more sensors of a first vehicle observes a road sign. The instructions further cause the apparatus to determine whether one or more second vehicles is obscuring the road sign in response to determining that the road sign is not observed by the one or more sensors. The instructions further cause the apparatus to determine whether the road sign is obscured due to a weather condition in response to determining that the one or more second vehicles is not obscuring the road sign. The instructions further cause the apparatus to generate a signal indicating that the road sign was obscured due to the weather condition in response to the road sign being obscured due to the weather condition.

According to a second aspect, a method of deducing a state of visibility of one or more road signs is described. The method includes receiving location data indicating location of a first vehicle, receiving road observation data from a first sensor of a plurality of sensors associated with the first vehicle, and determining whether the first vehicle is proximate to the road sign based on the location data. The method further includes determining whether the first sensor observes the road sign based on the road observation data in response to determining that the first vehicle is proximate to the road sign. The method further includes determining whether one or more second vehicles is obscuring the road sign using the road observation data in response to determining that the road sign is not observed. The method further includes determining whether a second sensor of the plurality of sensors generates readings indicating a weather condition in response to determining that the one or more second vehicles is not obscuring the road sign. The method further includes generating, using a processor, a signal indicating that the road sign was obscured due to the weather condition in response to the one or more second sensors generating the readings.

According to a third aspect, a non-transitory computer-readable storage medium having computer program code instructions stored therein is described. The computer program code instructions, when executed by at least one processor, cause the at least one processor to receive location data including location information of one or more first vehicles. The instructions further cause the at least one processor to, for each of the one or more first vehicles, determine whether the first vehicle encounters a road sign using the location data. The instructions further cause the at least one processor to, for each of the one or more first vehicles, determine whether a sensor associated with the first vehicle observes the road sign in response to determining that the first vehicle encounters the road sign. The instructions further cause the at least one processor to, for each of the one or more first vehicles, determine whether one or more second vehicles are obscuring the road sign in response to determining that the road sign is not observed by the sensor. The instructions further cause the at least one processor to, for each of the one or more first vehicles, determine whether the road sign is obscured due to a weather condition in response to determining that the one or more second vehicles are not obscuring the road sign. The instructions further cause the at least one processor to, for each of the one or more first vehicles, generate a signal indicating that the road sign was obscured due to the weather condition in response to the road sign being obscured due to the weather condition. The instructions further cause the at least one processor to generate a confidence of obscureness based on the one or more signals. The confidence of obscureness indicates a confidence level of which the road sign is obscured due to the weather condition.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments. The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings.

DETAILED DESCRIPTION

Vehicles include sensors, such as cameras, for identifying sign information presented by a road sign. When the vehicles are approaching the road sign, the cameras observe the road environment to detect the road sign and identify the sign information associated with the road sign. When the road sign is detected, the vehicles generate vehicle sensor data including a timestamp of which the road sign was detected and transmits the sign recognition message to a map server. The map server acquires a position estimation data including a timestamp of which the vehicle is predicted to observe the road sign. If the timestamps of the vehicle sensor data and the position estimation data match, the map server determines the location where the vehicle observes the road sign in real time and use the location to validate attribute data associated with the road sign. In an event where the sign information is obscured, the vehicle generates the sign recognition message without the timestamp. Accordingly, the map server determines that the sign information was not observed by the vehicle. Since the sign recognition message does not indicate a reason as to why the sign information was observed by the front-facing cameras, the map server cannot update data associated with the road sign with confidence.

There will now be described an apparatus and associated methods that may address these issues.

Figure 1A:
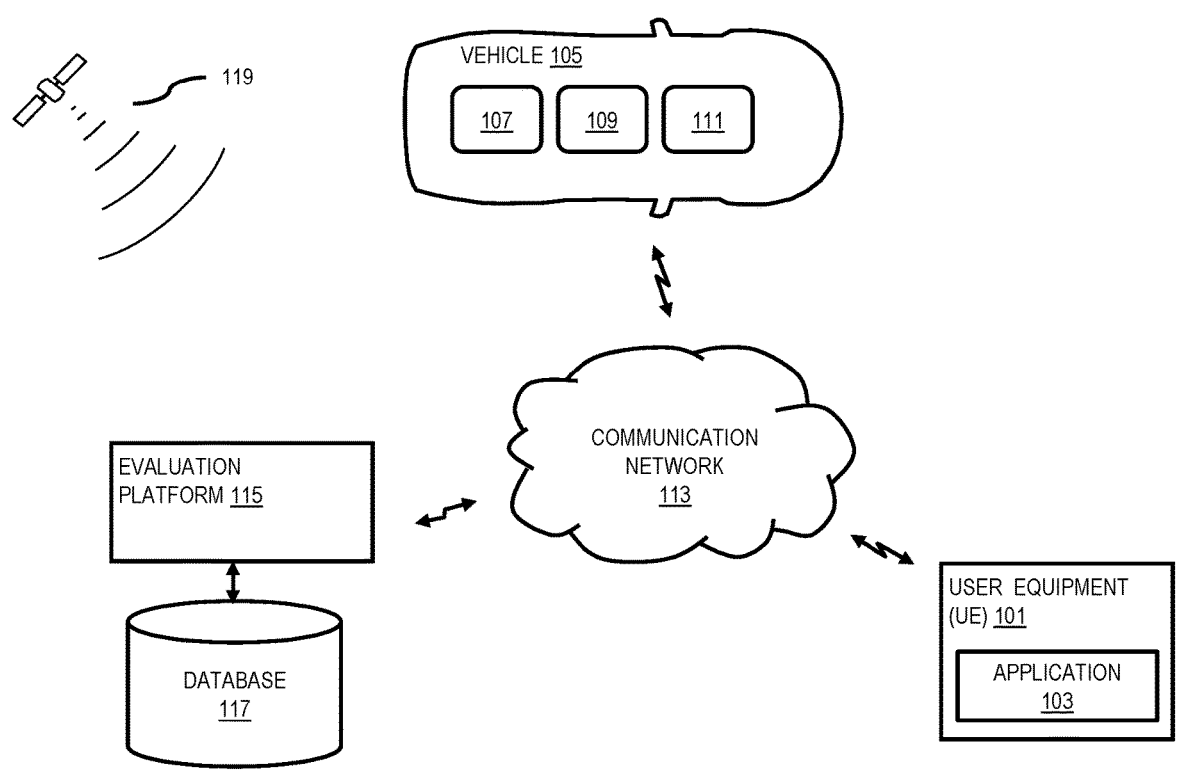
FIG. 1A illustrates a diagram of a system capable of determining a state of visibility of a road object using vehicle sensor data.

FIG. 1A is a diagram of a system 100 capable of determining a state of visibility of a road object, such a road sign, using vehicle sensor data, according to one embodiment. The system includes a user equipment (UE) 101, a vehicle 105, a communication network 113, an evaluation platform 115, a database 117, and a satellite 119. Additional or a plurality of mentioned components may be provided.

In the illustrated embodiment, the system 100 comprises a user equipment (UE) 101 that may include or be associated with an application 103. In one embodiment, the UE 101 has connectivity to an evaluation platform 115 via the communication network 113. The evaluation platform 115 performs one or more functions associated with evaluating vehicle sensor data to detect road sign obscurity.

In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with one or more vehicles (including vehicle 105) or any combination thereof, including the accessories and peripherals of these devices, or any combination thereof. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 101 can be a cellular telephone. A user may use the UE 101 for navigation functions, for example, road link map updates. It should be appreciated that the UE 101 can support any type of interface to the user (such as "wearable" devices, etc.). In one embodiment, the one or more vehicles may have cellular or Wi-Fi connection either through the inbuilt communication equipment or from the UE 101 associated with the vehicles. The application 103 may assist in conveying information regarding at least one attribute associated a travel link via the communication network 113.

In the illustrated embodiment, the application 103 may be any type of application that is executable by the UE 101, such as a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the evaluation platform 115 and perform one or more functions associated with the functions of the evaluation platform 115 by interacting with the evaluation platform 115 over the communication network 113.

The vehicle 105 may be a standard gasoline powered vehicle, a hybrid vehicle, an electric vehicle, a fuel cell vehicle, and/or any other mobility implement type of vehicle. The vehicle 105 includes parts related to mobility, such as a powertrain with an engine, a transmission, a suspension, a driveshaft, and/or wheels, etc. The vehicle 105 may be a semi-autonomous vehicle (e.g., some routine motive functions, such as parking, are controlled by the vehicle 105), or an autonomous vehicle (e.g., motive functions are controlled by the vehicle 105 without direct driver input). In this illustrated example, the vehicle 105 includes a plurality of sensors 107, an on-board computing platform 109, and an on-board communication platform 111.

In the illustrated embodiment, the sensors 107 includes at least one first type of sensors and at one second different type of sensors. The first type of sensors (hereinafter first sensors) may be image sensors, such as electronic imaging devices of both analog and digital types, which include digital cameras, camera modules, camera phones, thermal imaging devices, radar, sonar, lidar, etc. The second type of sensors (hereinafter second sensors) may be one or more vehicle sensors that indicate at least one attribute of a weather condition that is affecting the vehicle 105. The second sensors may be non-image sensors such as external air temperature sensors, vehicle wiper blade status sensors, moisture sensors, pressure sensors, etc. Other sensors may include, for example, a global positioning sensor for gathering location data, a network detection sensor for detecting wireless signals or receivers for different short-range communications (e.g., Bluetooth, Wi-Fi, Li-Fi, near field communication (NFC) etc.), temporal information sensors, an audio recorder for gathering audio data, velocity sensors, and the like. In another embodiment, the sensors 107 may include light sensors, oriental sensors augmented with height sensor and acceleration sensor, tilt sensors to detect the degree of incline or decline of the vehicle 105 along a path of travel, etc. In a further embodiment, sensors about the perimeter of the vehicle 105 may detect the relative distance of the vehicle 105 from lanes or roadways, the presence of other vehicles, pedestrians, traffic lights, road features (e.g., curves) and any other objects, or a combination thereof. In one embodiment, the vehicle 105 may include GPS receivers to obtain geographic coordinates from satellites 119 for determining current location and time associated with the vehicle 105. Further, the location can be determined by a triangulation system such as A-GPS, Cell of Origin, or other location extrapolation technologies.

The on-board computing platform 109 performs one or more functions associated with the vehicle 105. In one embodiment, the on-board computing platform 109 may aggregate sensor data generated by at least one of the sensors 107 and transmit the sensor data via the on-board communications platform 111. The on-board computing platform 109 may receive control signals for performing one or more of the functions from the evaluation platform 115, the UE 101, or a combination thereof via the on-board communication platform 111. The on-board computing platform 109 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The on-board communications platform 109 includes wired or wireless network interfaces to enable communication with external networks. The on-board communications platform 109 also includes hardware (e.g., processors, memory, storage, antenna, etc.) and software to control the wired or wireless network interfaces. In the illustrated example, the on-board communications platform 109 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 109 includes a wired or wireless interface (e.g., an auxiliary port, a Universal Serial Bus (USB) port, a Bluetooth® wireless node, etc.) to communicatively couple with the UE 101.

The communication network 113 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the evaluation platform 115 may be a platform with multiple interconnected components. The evaluation platform 115 may include multiple servers, intelligent networking devices, computing devices, components and corresponding software for determining a state of visibility for a road object using vehicle sensor data. It should be appreciated that that the evaluation platform 115 may be a separate entity of the system 100 or included within the UE 101 (e.g., as part of the applications 103).

The evaluation platform 115 may determine a state of visibility for a road object, such a road sign, using vehicle sensor data and validate attribute data associated with the road object, where the attribute data may at least indicate a location of the road object within a map. In one embodiment, the evaluation platform 115 receives location data associated with the vehicle 105 and determine a road segment/link on which the vehicle 105 currently traversing. In one embodiment, the received vehicle data may pass through an original equipment manufacturer (OEM) cloud or network, such as in addition to or in alternative to the communication network 113. Alternatively, an OEM network may be part of the communication network 113. The evaluation platform 115 may further determine at least one attribute associated with the road segment/link using attribute data acquired from the database 117. If the attribute indicates that the road segment/link includes a road object, such as a road sign, the evaluation platform 115 determines location data associated with the road sign and further determines whether the vehicle 105 is proximate to the road sign using the location data associated with the vehicle and the road sign. If the vehicle 105 is proximate to the road sign, the evaluation platform 115 may receive road observation data from the vehicle 105 to determine whether the first sensors have observed sign information presented by the road sign. Hereinafter, vehicle sensor data that indicate observation of a road environment will be referred as road observation data. The road observation data may be acquired via the first sensors. If the first sensors observe the sign information, the evaluation platform 115 may update the database 117 to specify that road sign attribute data has been recently validated and is accurate, where the road sign attribute data indicates at least one attribute of the road sign. If the first sensors do not observe the sign information, the evaluation platform 115 may further receive and process road observation data from the vehicle 105 to determine whether another vehicle is obscuring the road sign. Alternatively or additionally, the evaluation platform 115 may receive road observation data from one or more vehicles that are proximate to the vehicle 105 and communicatively coupled to the communication network 113 (hereinafter referred as proximate vehicles) to determine whether another vehicle is obscuring the road sign from the vehicle 105. In one embodiment, the evaluation platform 115 may use location data associated with the proximate vehicle to determine whether another vehicle is obscuring the road sign from the vehicle 105. If the road observation data indicates that another vehicle is obscuring the road sign, the evaluation platform 115 may update the database 117 to specify that: (1) most recent validation of the road sign could not be performed due to the obstruction; and (2) the road sign attribute data is accurate. If the road observation data indicates that another vehicle is obscuring the road sign, the evaluation platform 115 may further receive and process the vehicle sensor data to determine whether the second sensors generate vehicle sensor data that indicate a weather condition. Alternatively or additionally, the evaluation platform 115 may acquire vehicle sensor data from second sensors of one or more vehicles that are proximate to the vehicle 105 and communicatively coupled to the communication network 113 to determine whether the second sensors generate vehicle sensor data that indicate a weather condition. Since adverse weather conditions impact visibility of the road sign, vehicle sensor data indicating such weather condition may provide contextual evidence as to why the road sign is obscured. If the second sensors generate vehicle sensor data indicating the weather condition, the evaluation platform 115 may update the database 117 to specify that: (1) most recent validation of the road sign could not be performed due to adverse weather conditions; and (2) the road sign attribute data is accurate. In one embodiment, If the second sensors generate vehicle sensor data indicating the weather condition, the evaluation platform 115 may inform a local municipality that the visibility of the road sign is obscured due to the weather condition. If the second sensors do not generate vehicle sensor data indicating the weather condition, the evaluation platform 115 may update the database 117 to specify that the road sign attribute data is inaccurate. In one alternative embodiment, if the second sensors do not generate vehicle sensor data indicating the weather condition, the evaluation platform 115 may generate a flag indicating that the road sign attribute data must be further evaluated. In one alternative embodiment, if the second sensors do not generate vehicle sensor data indicating the weather condition, the evaluation platform 115 may update the database 117 by omitting the road sign from a map. In one embodiment, the evaluation platform 115 may establish a confidence level of whether the road sign is obscured due to the weather condition. The confidence level may be variable based on road observation data acquired from a plurality of vehicles. Once the confidence level reaches threshold level, the evaluation platform 115 may update the database 117 to specify that: (1) the road sign is obscured due to the weather condition; and (2) the road sign attribute data is accurate.

In the illustrated embodiment, the database 117 stores information on road links (e.g., road signs associated with road links, road length, road breadth, slope information, curvature information, etc.) and probe data for one or more road links (e.g., traffic density information). In one embodiment, the database 117 may include any multiple types of information that can provide means for aiding in the content provisioning and sharing process. It should be appreciated that the information stored in the database 117 may be acquired from any of the elements within the system 100, other vehicles, sensors, database, or a combination thereof.

In one embodiment, the UE 101, the vehicle 105, and the evaluation platform 115 communicate with each other and other components of the communication network 113 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
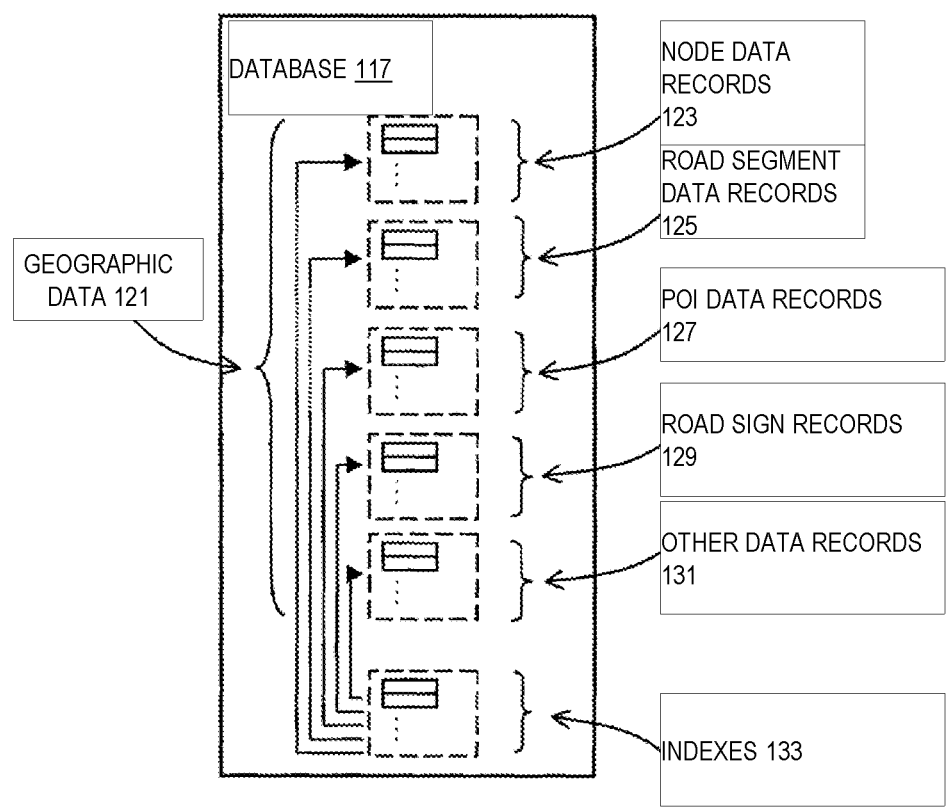
FIG. 1B illustrates a diagram of a database of the system of FIG. 1A.

FIG. 1B is a diagram of a database 117, e.g., a map database, according to one embodiment. In one embodiment, the database 117 includes geographic data 121 used for (or configured to be compiled to be used for) mapping and/or navigation-related services. In one embodiment, the following terminology applies to the representation of geographic features in the database 117.

a. "Node"—A point that terminates a link.
b. "Line segment"—A straight line connecting two points.
c. "Link" (or "edge")—A contiguous, non-branching string of one or more line segments terminating in a node at each end.

In one embodiment, the database 117 follows certain conventions. For example, links do not cross themselves and do not cross each other except at a node. Also, there are no duplicated shape points, nodes, or links. Two links that connect each other have a common node.

As shown, the database 117 includes node data records 123, road segment or link data records 125, point of interest (POI) data records 127, road sign records 129, other records 131, and indexes 133, for example. More, fewer or different data records can be provided. In one embodiment, additional data records (not shown) can include cartographic ("carto") data records, routing data, and maneuver data. In one embodiment, the indexes 133 may improve the speed of data retrieval operations in the database 117. In one embodiment, the indexes 133 may be used to quickly locate data without having to search every row in the database 117 every time it is accessed.

In exemplary embodiments, the road segment data records 125 are links or segments representing roads, streets, or paths, as can be used in the calculated route or recorded route information for determination of one or more personalized routes. The node data records 123 are end points (such as intersections) corresponding to the respective links or segments of the road segment data records 125. The road link data records 125 and the node data records 123 represent a road network, such as used by vehicles, cars, and/or other entities. Alternatively, the database 117 can contain path segment and node data records or other data that represent pedestrian paths or areas in addition to or instead of the vehicle road record data, for example.

Links, segments, and nodes can be associated with attributes, such as geographic coordinates, street names, address ranges, speed limits, turn restrictions at intersections, presence of a construction work site, and other navigation related attributes, as well as POIs, such as gasoline stations, hotels, restaurants, museums, stadiums, offices, automobile dealerships, auto repair shops, buildings, stores, parks, etc. The database 117 can include data about the POIs and their respective locations in the POI data records 127. The database 117 can also include data about places, such as cities, towns, or other communities, and other geographic features, such as bodies of water, mountain ranges, etc. Such place or feature data can be part of the POI data records 127 or can be associated with POIs or POI data records 127 (such as a data point used for displaying or representing a position of a city).

In one embodiment, the database 117 can also include road sign records 129 for storing road sign attribute data. The road sign attribute data can indicate a road sign location, sign information displayed by the road sign, road sign dimension, orientation, type, classification, etc. The road sign records 129 may include information indicating whether a road sign is associated with a specific segment of a road link (as opposed to an entire link) and information indicating a flow of traffic that the road sign is designed to be associated with within a given node. In one embodiment, the road sign records 129 may be associated with or integrated partially or wholly with one or more of the node records 123, road segment records 125, POI data records 127, and/or other data record 131.

Other records 131 may include validation records indicating at least one instance of which map data associated with a road object, as stored in the database 117, has been validated using a sensor or a human observation. By way of example, a validation record associated with a road object, such a road sign, would indicate an instance of which a vehicle camera has verified the existence of the road sign, accuracy of one or more attribute associated with the road sign, or a combination thereof. Other records 131 may further include confidence records indicating a confidence level associated with a state of a road object. By way of example, a confidence record associated with a road sign would indicate a confidence level of which the road sign was obscured due to an adverse weather condition. The confidence level may be variable based on one or more instances of which a sensor or a human observation has validated the state of the road object was within a given time frame. Other records 131 may further include historical data indicating past states of one or more road objects, past vehicle sensor data, past weather data affecting the one or more road objects, the vehicle 105, or a combination thereof, etc. In one embodiment, certain historical data may be associated with past weather conditions to provide context as to how certain past states of one or more road objects were affected by the past weather conditions and what type of sensor data were generated during the past weather conditions. Other records 131 may further include other road object data that are similar to the road sign data discussed above.

In one embodiment, the database 117 can be maintained by a content provider in association with a map developer. The map developer can collect geographic data to generate and enhance the database 117. There can be different ways used by the map developer to collect data. These ways can include obtaining data from other sources, such as municipalities or respective geographic authorities. In addition, the map developer can employ field personnel to travel by vehicle along roads throughout the geographic region to observe road signs and/or record information about them, for example. Also, remote sensing, such as aerial or satellite photography, can be used.

The database 117 can be a master database stored in a format that facilitates updating, maintenance, and development. For example, the master database or data in the master database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for determining a state of visibility for a road object may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 2:
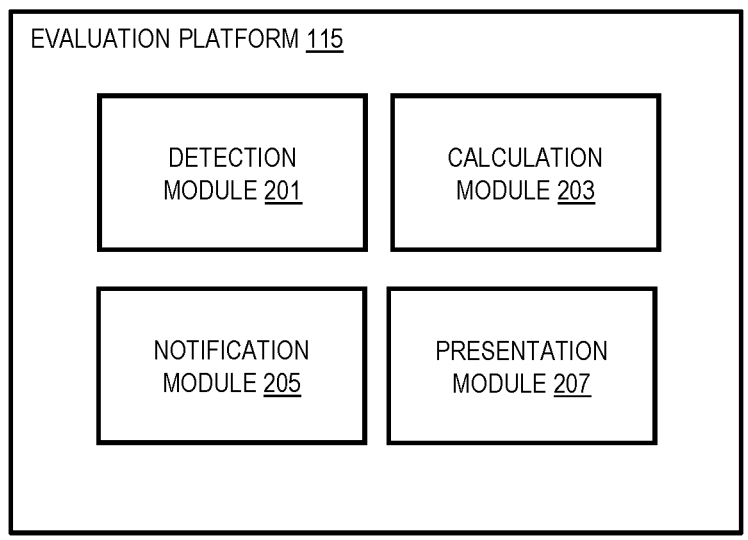
FIG. 2 illustrates a diagram of the components of the evaluation platform of FIG. 1A.

FIG. 2 is a diagram of the components of the evaluation platform 115, according to one embodiment. By way of example, the evaluation platform 115 includes one or more components for determining a state of a road object, such as a road sign, using vehicle sensor data. It is contemplated that the functions of these components may be combined in one or more components or performed by other components of equivalent functionality. In this embodiment, the evaluation platform 115 includes detection module 201, calculation module 203, notification module 205, and presentation module 207.

In one embodiment, the detection module 201 may identify location data including coordinates, heading, speed information, timestamp information, or a combination thereof for the vehicle 105. The detection module 201 may further identify a travel link associated with the vehicle 105. The travel link may include road links/segments and nodes. The travel link may indicate a navigational route to a destination requested by a user associated with the UE 101 and the vehicle 105. In one embodiment, the detection module 201 may detect the travel link input via the UE 101 and further detects one or more attributes associated with the travel link. In one embodiment, the detection module 201 may automatically detect a current road segment/link of which the vehicle 105 is traversing and further detects one or more attributes associated with a portion of the road segment/link that the vehicle 105 has yet to traverse. The one or more attributes includes road object information, slope information, curvature information, lanes information, width information, or a combination thereof. Using the road object information, the detection module 201 may detect a road object that the vehicle 105 is about to encounter within the travel link or the road segment/link of which the vehicle 105 is traversing. For each detected road object, the detection module 201 identifies one or more attributes associated with the road object (e.g., type of road object, location of road object). In one embodiment, the detection module 201 may receive the vehicle sensor data from one or more of the sensors 107. In one embodiment, upon identifying the road links/segments of which the vehicle 105 is traversing, the detection module 201 may further identify one or more proximate vehicles. For example, vehicles within ±30 meters from the vehicle 105 may be considered as proximate vehicles. The detection module 201 may acquire vehicle specification data from one or more proximate vehicles to determine whether said proximate vehicles are equipped with sensors such as the first and second sensors of the vehicle 105. If the proximate vehicles are equipped such sensors, the detection module 201 may provide vehicle sensors data acquired from the proximate vehicles to the calculation module 203. It should be appreciated that the detection module 201 may receive any data from any of the components within the system 100 or any system or device communicatively coupled to the communication network 113.

In one embodiment, the calculation module 203 may use the location data of the vehicle 105 and a road object, such as a road sign, associated with a road segment/link on which the vehicle 105 is traversing to calculate the proximity of the vehicle 105 with respect to the road sign. If the calculation module 203 determines that the vehicle 105 is within a predetermined distance from the road sign, the calculation module 203 may cause the vehicle 105 to continuously transmit the road observation data for the duration of which the vehicle 105 is within the predetermined distance. The predetermined distance is established to account for uncertainty in calculating the proximity of the vehicle 105 with respect to the road sign using the location data (e.g., GPS uncertainty). By way of example, the predetermined distance may be ±30 meters with respect to the location of the road sign. It should be appreciated that the predetermined distance may configured based on a user's choice (e.g., via the UE 101). When the vehicle 105 is within the predetermine distance, the calculation module 203 uses the road observation data to determine whether the first sensors among the sensors 107 observe the road sign. In one embodiment, the calculation module 203 may render the determination of whether the first sensors observe the road sign by processing one or more images captured by the first sensors at one or more locations proximate to the road sign. In such embodiment, the calculation module 203 may determine the one or more locations based on historical data indicating past instances where vehicle sensors have captured images including the road sign. In such embodiment, the calculation module 203 may attempt to identify the road sign from each of said images captured by the first sensors by using the historical data. For example, the historical data may indicate that a road sign appears in a specific section of an image, and the calculation module 203 may analyse the specific section for each of said images captured by the first sensors to identify the road sign.

If the first sensors observe the road sign, the calculation module 203 may update the database 117 to specify that road sign attribute data associated with the road sign has been recently validated and are accurate. In one embodiment, when the first sensors observe the road sign, the vehicle 105 generates the road observation data including a timestamp of which the first sensors observe the road sign. In such embodiment, the calculation module 203 generates a position estimation data including a timestamp of which the vehicle 105 is predicted to observe the road sign. The position estimation data may be generated based the location data associated with the vehicle 105 and the road sign. If the timestamps of the vehicle sensor data and the position estimation data match, the calculation module 203 may determine location information indicating a location at which the vehicle 105 observes road sign in real time. Using the location information, the calculation module 203 may update the database 117 to specify that road sign attribute data has been recently validated and are accurate. If the first sensors do not observe the road sign, the calculation module 203 may further receive and process road observation data to determine whether another vehicle is obscuring the road sign. In one embodiment, if the first sensors of the vehicle 105 do not observe the road sign, the calculation module 203 may receive and process road observation data acquired from one or more proximate vehicles to determine whether another vehicle is obscuring the road sign from the vehicle 105. In one embodiment, the calculation module 203 may aggregate road observation data acquired from the first sensors of the vehicle 105 and one or more proximate vehicles to determine whether another vehicle is obscuring the road sign from the vehicle 105. It is contemplated that since the obscuring vehicle may be a proximate vehicle, the proximate vehicle may report itself to the calculation module 203 that the proximate vehicle is obscuring the view of the road sign. In one embodiment, the calculation module 203 may use location data associated with the proximate vehicle to determine whether another vehicle is obscuring the road sign from the vehicle 105.

If the road observation data indicates that another vehicle is obscuring the road sign, the calculation module 203 may update the database 117 to specify that: (1) most recent validation of the road sign could not be performed due to the obstruction; and (2) the road sign attribute data are accurate. If the road observation data indicates that another vehicle is not obscuring the road sign, the calculation module 203 may further receive and process the vehicle sensor data to determine whether the second sensors generate vehicle sensor data that indicate a weather condition. By way of example, external air temperature sensors mounted on the vehicle 105 may indicate that external air temperature is less than −5 degree Celsius, and vehicle wiper blade status sensors may indicate that wiper blades of the vehicle 105 are activated. In such example, the calculation module 203 may refer to the historical data that associates similar vehicle sensor data to an adverse weather condition, such as a snowstorm. Using the historical data, the calculation module 203 may conclude that the state of visibility for the road sign is obscured due to the adverse weather condition impacting the road sign. Continuing from the above example, one or more pressure sensors may be mounted on the exterior surface of the vehicle 105, and the pressure sensor may indicate that wind direction is along a first direction. The calculation module 203 may receive road sign attribute data to determine an angle of which a sign face of the road sign is oriented and determine that the sign face is within the first direction. The historical data may indicate that a sheet of snow/ice is likely to form on the sign face if the sign face faces the direction of the wind during a snowstorm. Using the historical data, the calculation module 203 may conclude that the road sign was not observed by the first sensors due to a sheet of snow/ice obscuring the road sign. If the second sensors do not generate vehicle sensor data that indicate the weather condition, the calculation module 203 may: (1) update the database 117 to specify that the road sign attribute data is inaccurate; (2) generate a flag indicating that the road sign attribute data must be further evaluated; or (3) update the database 117 by omitting the road sign from a map. In one embodiment, if the road observation data indicates that another vehicle is not obscuring the road sign, the calculation module 203 may receive and process vehicle sensor data acquired from one or more proximate vehicles to determine whether second sensors of said proximate vehicles generate vehicle sensor data that indicate a weather condition. In one embodiment, the calculation module 203 may aggregate vehicle sensor data acquired from the second sensors of the vehicle 105 and one or more proximate vehicles to determine whether the second sensors of the vehicle 105 and said proximate vehicles generate vehicle sensor data that indicate a weather condition.

In one embodiment, the calculation module 203 may establish or update a confidence level of whether the road sign is obscured due to the weather condition. In such embodiment, the calculation module 203 may receive vehicle sensor data from a plurality of vehicles that encounter the road sign. Using the vehicle sensor data from the plurality of vehicles, the calculation module 203 determines, for each of the plurality of vehicles, whether the second sensors of said vehicle generate vehicle sensor data that indicate the weather condition. For each vehicle that generate vehicle sensor data indicating the weather condition, the calculation module 203 increases the confidence level by an increment. As such, once the confidence level reaches threshold level, the calculation module 203 may update the database 117 to specify that: (1) the road sign is obscured due to the weather condition; and (2) the road sign attribute data is accurate. Similarly, a confidence level may be employed for a plurality of instances where the first sensors do not observe the road sign and the second sensors do not generate vehicle sensor data indicating the weather condition. Once such confidence level reaches a threshold, the calculation module 203 may: (1) update the database 117 to specify that the road sign attribute data is inaccurate; (2) generate a flag indicating that the road sign attribute data must be further evaluated; or (3) update the database 117 by omitting the road sign from a map.

In one embodiment, the calculation module 203 may use one or more rear-facing first sensors to acquire additional validation for a road sign. By way of example, the calculation module 203 may determine that the vehicle 105 is moving away from a road sign that is employed for an opposing traffic using the location data of the vehicle 105 and the road sign. In such example, the calculation module 203 may determine whether the vehicle 105 includes at least one rear-facing camera that is capable of capturing images including the road sign. If the calculation module 203 determines that the vehicle 105 includes the rear-facing camera, the calculation module 203 may obtain road observation data from the rear-facing camera. Since a rear-facing camera of a vehicle generally faces the sign face of a road sign employed for an opposing traffic, the calculation module 203 may acquire additional road observation data to determine the state of visibility for the road sign.

The notification module 205 may cause a notification to the UE 101 on: (1) whether the vehicle 105 is within a predetermined distance from a road sign; (2) whether the first sensors have observed the road sign; (3) whether another vehicle is obscuring the road sign; (3) whether the road sign is obscured due to a weather condition; (4) the confidence level of whether the road sign is obscured due to the weather condition; (5) or a combination thereof. In one embodiment, the notification module 205 may cause the notification to one or more vehicle that is communicatively coupled to the communication network 113 and is about to encounter the road sign. In one embodiment, the notification module 205 may cause an alarm notification if the state of visibility indicates obscurity or the confidence level reaches a threshold level. The one or more notification may include sound notification, display notification, vibration, or a combination thereof. In one embodiment, the notification module 205 may provide the notification to a local municipality associated with the road sign.

In one embodiment, the presentation module 207 obtains a set of information, data, and/or calculated results from other modules, and continues with providing a presentation of a visual indicator to the UE 101. The visual indicator may include: (1) the vehicle 105; (2) a travel link or a road segment/link on which the vehicle 105 is traversing; (3) a road sign associated with the travel link or the road segment/link; (4) a visual indicator indicating whether the first sensors have observed the road sign; (5) a visual indicator indicating whether another vehicle is obscuring the road sign; (6) a visual indicator indicating whether the road sign is obscured due to a weather condition; (7) a visual indicator indicating the confidence level of whether the road sign is obscured due to the weather condition; (8) or a combination thereof. In one embodiment, the visual indicator may be a real-time map. In one embodiment, the presentation module 207 may provide the visual indicator to one or more vehicle that are communicatively coupled to the communication network 113 and sharing the road segment/link of which the vehicle 105 is traversing.

The above presented modules and components of the evaluation platform 115 can be implemented in hardware, firmware, software, or a combination thereof. Though depicted as a separate entity in FIG. 1A, it is contemplated that the evaluation platform 115 may be implemented for direct operation by the UE 101. As such, the evaluation platform 115 may generate direct signal inputs by way of the operating system of the UE 101 for interacting with the applications 103. In another embodiment, one or more of the modules 201-207 may be implemented for operation by the UE 101, as the evaluation platform 115, or a combination thereof. The various executions presented herein contemplate any and all arrangements and models.

Figure 3:
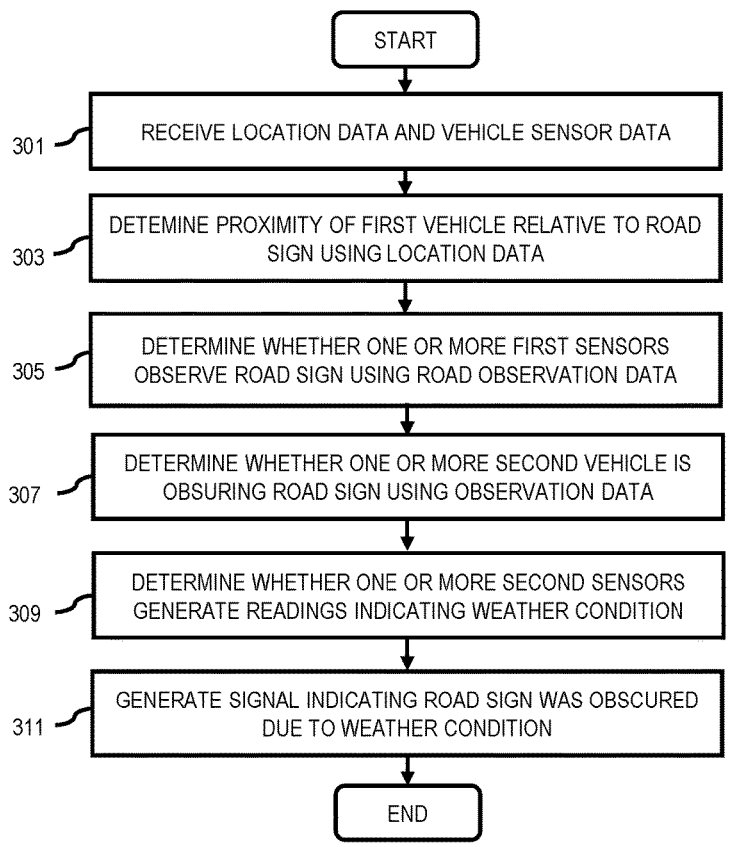
FIG. 3 illustrates a flowchart of a process for determining a state of visibility for a road object using vehicle sensor data.
Figure 6:
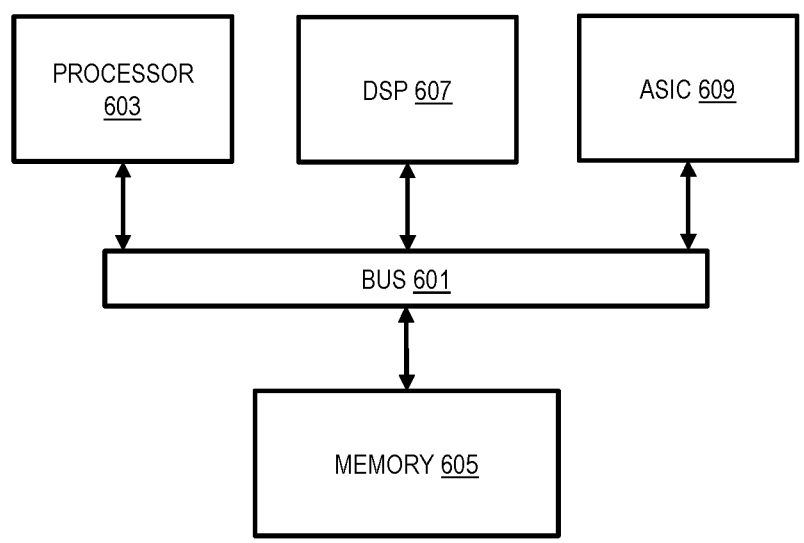
FIG. 6 illustrates a chip set or chip upon which an embodiment may be implemented.

FIG. 3 is a flowchart of a process 300 for determining a state of visibility for a road sign using vehicle sensor data, according to one embodiment. In one embodiment, the evaluation platform 115 performs the process 300 and is implemented in, for instance, a chip set including a processor and a memory as shown in FIG. 6.

In step 301, the evaluation platform 115 may receive location data associated with the vehicle 105 and the road sign. The location data of the vehicle 105 may include coordinates, heading, speed information, timestamp information, or a combination thereof. The evaluation platform 115 may further receive vehicle sensor data from the sensors 107. Alternatively or additionally, the evaluation platform 115 may receive vehicle sensor data from one or more proximate vehicles. The vehicle sensor data may include readings generated by the first sensor (e.g., road observation data) and reading generated by the second sensors (e.g., readings indicating a weather condition).

In step 303, the evaluation platform 115 may determine proximity of the vehicle 105 relative to the road sign using the location data associated with the vehicle 105 and the road sign. By way of example, the predetermined distance may be ±30 meters with respect to the location of the road sign. The predetermined distance may be configured through a user device such as the UE 101.

In step 305, if the vehicle 105 is within a predetermined distance from the road sign, the evaluation platform 115 determines whether the first sensors observe the road sign using the road observation data. The evaluation platform 115 may render the determination by processing one or more images captured by the first sensors at one or more locations proximate to the road sign. The evaluation platform 115 may determine the one or more locations based on historical data indicating past instances where vehicle sensors have captured images including the road sign. For each of said images captured by the first sensors, the evaluation platform 115 may attempt to identify the road sign using the historical data. For example, the historical data may indicate that a road sign appears in a specific section of an image, and the evaluation platform 115 may analyse the specific section for each of said images captured by the first sensors to identify the road sign. In one embodiment, the evaluation platform 115 may receive and process road observation data acquired from one or more proximate vehicles to determine whether another vehicle is obscuring the road sign from the vehicle 105 or aggregate road observation data acquired from the first sensors of the vehicle 105 and one or more proximate vehicles to determine whether another vehicle is obscuring the road sign from the vehicle 105.

In step 307, if the first sensors do not observe the road sign within the predetermined distance from the road sign, the evaluation platform 115 determines whether another vehicle is obscuring the road sign using the road observation data. If the first sensors observe the road sign, the evaluation platform 115 may update the database 117 to specify that road sign attribute data associated with the road sign has been validated and are accurate. In one embodiment, the evaluation platform 115 may receive and process road observation data acquired from one or more proximate vehicles to determine whether another vehicle is obscuring the road sign from the vehicle 105. In one embodiment, the evaluation platform 115 may aggregate road observation data acquired from the first sensors of the vehicle 105 and one or more proximate vehicles to determine whether another vehicle is obscuring the road sign from the vehicle 105. In one embodiment, the evaluation platform 115 may use location data associated with the proximate vehicle to determine whether another vehicle is obscuring the road sign from the vehicle 105.

In step 309, if another vehicle is not obscuring the road sign, the evaluation platform 115 may determine whether the second sensors are generating readings indicating an adverse weather condition. By way of example, external air temperature sensors mounted on the vehicle 105 may indicate that external air temperature is less than −5 degree Celsius, and vehicle wiper blade status sensors may indicate that wiper blades of the vehicle 105 are activated. In such example, the evaluation platform 115 may refer to the historical data that associates similar vehicle sensor data to an adverse weather condition, such as a snowstorm. Using the historical data, the evaluation platform 115 may conclude that the state of visibility for the road sign is obscured due to the adverse weather condition impacting the road sign. Continuing from the above example, one or more pressure sensors may be mounted on the exterior surface of the vehicle 105, and the pressure sensor may indicate that wind direction is along a first direction. The evaluation platform 115 may receive road sign attribute data to determine an angle of which a sign face of the road sign is oriented and determine that the sign face is within the first direction. The historical data may indicate that a sheet of snow/ice is likely to form on the sign face if the sign face faces the direction of the wind during a snowstorm. Using the historical data, the evaluation platform 115 may conclude that the road sign was not observed by the first sensors due to a sheet of snow/ice obscuring the road sign. If another vehicle is obscuring the road sign, the evaluation platform 115 may update the database 117 to specify that: (1) most recent validation of the road sign could not be performed due to another vehicle obscuring the road sign; and (2) the road sign attribute data are accurate.

In step 311, if the second sensors are generating the readings, the evaluation platform 115 may generate a signal indicating that the road sign was obscured due to the adverse weather condition. In one embodiment, the evaluation platform 115 may provide a notification, a visual indicator, or a combination thereof indicating that the road sign was obscured due to the adverse weather condition to the vehicle 105, the UE 101, one or more vehicles that is communicative coupled to the communication network 113 and is about to encounter the road sign, or a combination thereof. If the second sensors do not generate vehicle sensor data that indicate the adverse weather condition, the calculation module 203 may: (1) update the database 117 to specify that the road sign attribute data is inaccurate; (2) generate a flag indicating that the road sign attribute data must be further evaluated; or (3) update the database 117 by omitting the road sign from a map.

Figure 4A:
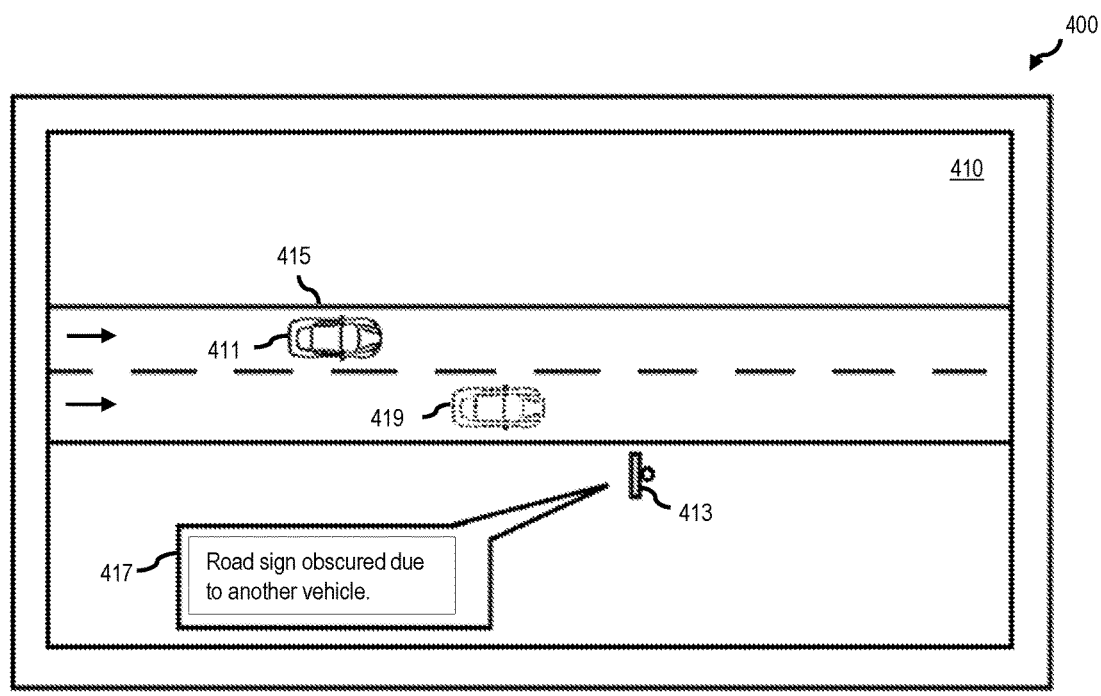
FIGS. 4A, 4B, and 4C illustrate an example user interface displaying a real time map for first, second, and third example scenarios, respectively.

FIG. 4A is an example user interface 400 displaying a real-time map 410 for a first example scenario, according to one embodiment. In one embodiment, the user interface 400 may be a component of the UE 101 in FIG. 1A. The user interface 400 displays the real-time map 410 including a vehicle model 411 indicating the current location of the vehicle 105, a road segment/link 415, a road sign model 413 indicating a location of a road sign, a message 417, and an obscuring vehicle 419. In the first example scenario, the vehicle 105 is traversing a two-lane, one directional road and is approaching the road sign, and the evaluation platform 115 has determined that: (1) the vehicle 105 is within a predetermined distance from the road sign; (2) the first sensors did not observe the road sign; and (3) the first sensors did not observe the road sign due to the obscuring vehicle 419 obscuring the road sign. Accordingly, the user interface 400 generated the message 417 stating "ROAD SIGN OBSCURED DUE TO ANOTHER VEHICLE." In the first example scenario, the first sensors are front-facing cameras that detected the road sign.

Figure 4B:
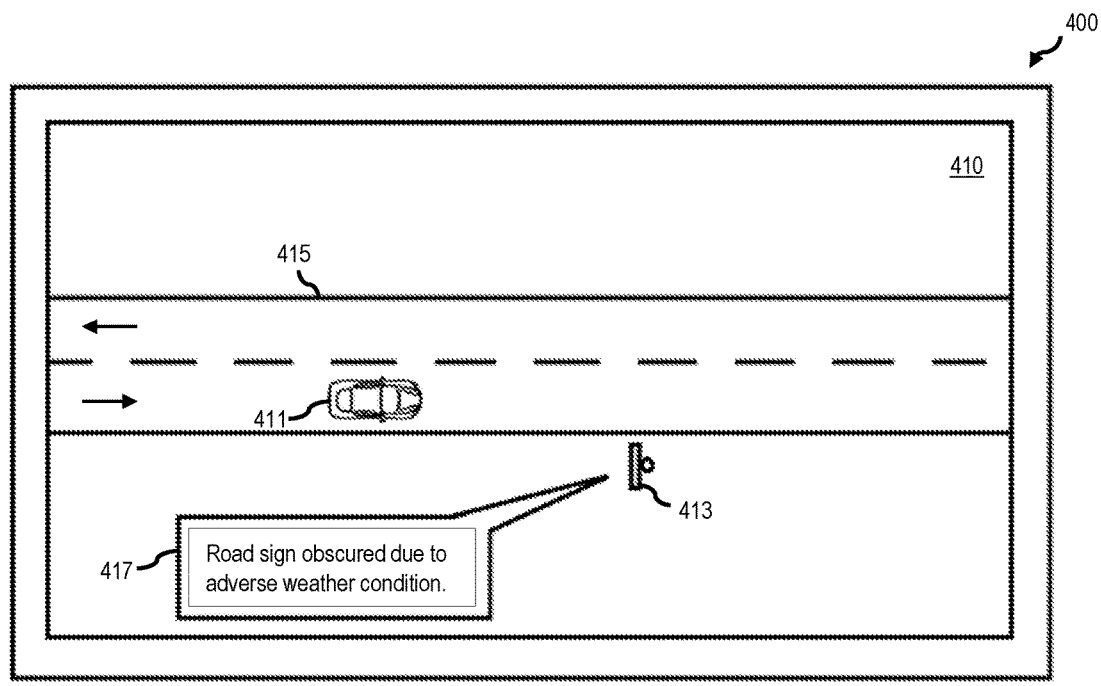

FIG. 4B is an example user interface 400 displaying a real-time map 410 for a second example scenario, according to one embodiment. In the second example scenario, the vehicle 105 is traversing a two-lane, bi-directional road and is approaching the road sign, and the evaluation platform has determined that: (1) the vehicle 105 is within a predetermined distance from the road sign; (2) the first sensors did not observe the road sign; (3) road observation data have indicated that another vehicle is not obscuring the road sign; and (4) the second sensors have generated readings indicating an adverse weather condition. Accordingly, the user interface 400 generated the message 417 stating "ROAD SIGN OBSCURED DUE TO ADVERSE WEATHER CONDITION." In the second example scenario, the first sensors are front-facing cameras that detected the road sign.

Figure 4C:
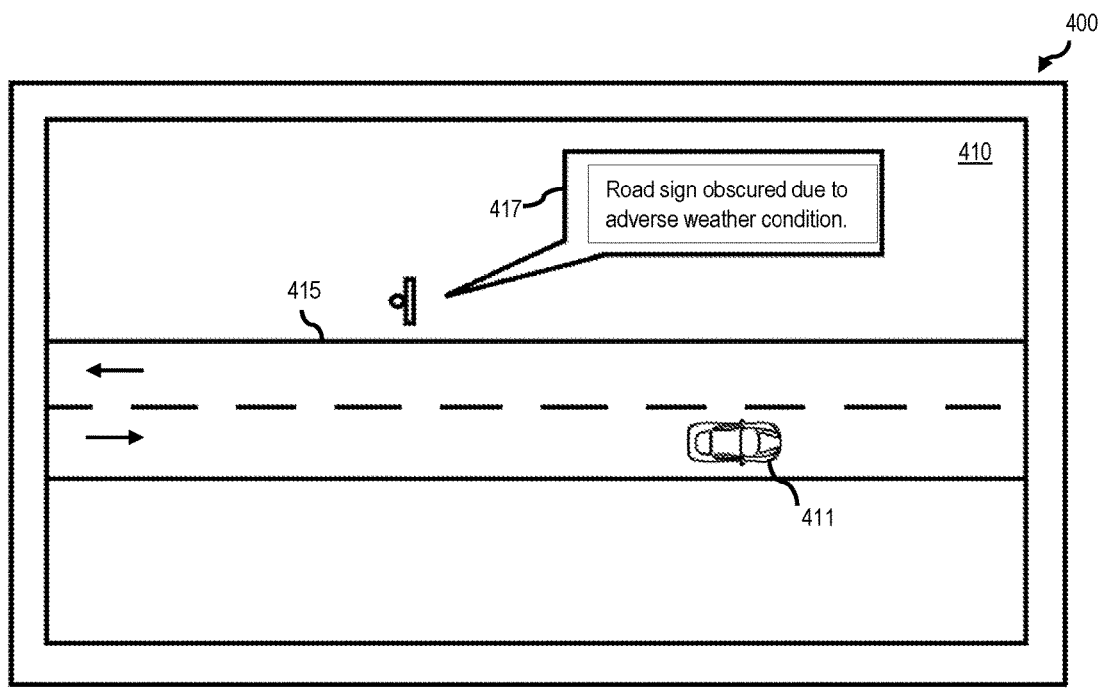

FIG. 4C is the example user interface 400 displaying the real-time map 410 for a third example scenario, according to one embodiment. In the third example scenario, the vehicle 105 is traversing a two-lane, bi-directional road. The road sign is disposed adjacent to a lane that is designated for traffic that opposes a direction of travel for the vehicle 105. The vehicle 105 has passed the road sign, and the evaluation platform has determined that: (1) the vehicle 105 is within a predetermined distance from the road sign; (2) the first sensors did not observe the road sign; (3) road observation data have indicated another vehicle is not obscuring the road sign; and (4) the second sensors have generated readings indicating an adverse weather condition. Accordingly, the user interface 400 generated the message 417 stating "ROAD SIGN OBSCURED DUE TO ADVERSE WEATHER CONDITION." In the third example scenario, the first sensors are rear-facing cameras that detected the road sign.

The system, apparatus, and methods described herein enable a map-based server/platform to determine a state of visibility for a road object using vehicle sensor data and validate attribute data associated with the road object, thereby improving map-based contents provided to consumers. Additionally, it is contemplated that image processing for identifying one or more road objects requires substantial amount of processing/memory resources. Since the system, apparatus, and methods described herein employ non-image sensors (such as the second sensors) to determine a state of visibility for a road sign, processing/memory resources are conserved and a computing system for determining a state of visibility of a road object is improved.

The processes described herein for predicting a state of visibility for a road sign using road sign attribute data and weather forecast data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
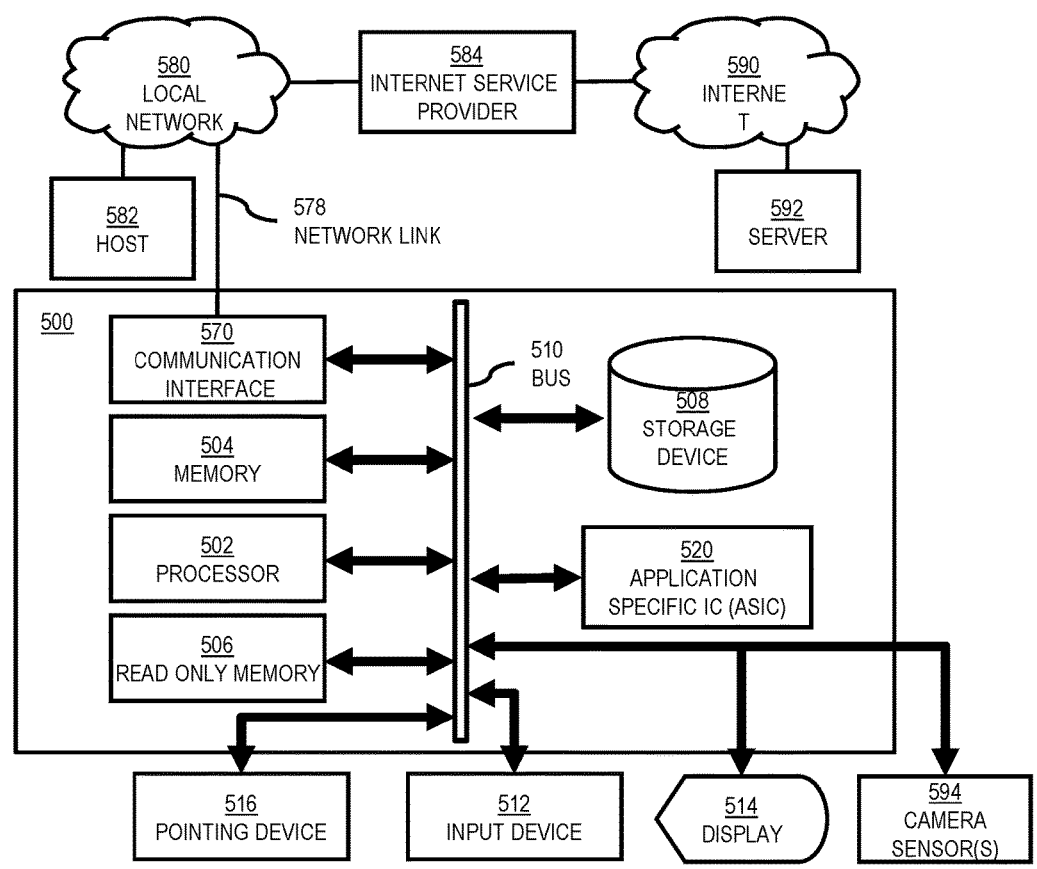
FIG. 5 illustrates a computer system upon which an embodiment may be implemented.

FIG. 5 illustrates a computer system 500 upon which an embodiment may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to determine safety levels for one or more travel links based, at least in part, on signage information as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of determining safety levels for one or more travel links based, at least in part, on signage information.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to determining safety levels for one or more travel links based, at least in part, on signage information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 500 also includes a memory 504 coupled to bus 510. The memory 504, such as a random access memory (RAM) or any other dynamic storage device, stores information including processor instructions for determining safety levels for one or more travel links based, at least in part, on signage information. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for determining safety levels for one or more travel links based, at least in part, on signage information, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514, and one or more camera sensors 594 for capturing, recording and causing to store one or more still and/or moving images (e.g., videos, movies, etc.) which also may comprise audio recordings. In some embodiments, for example, in embodiments in which the computer system 500 performs all functions automatically without human input, one or more of external input device 512, display device 514 and pointing device 516 may be omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 113 for determining safety levels for one or more travel links based, at least in part, on signage information to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 582 connected to the Internet hosts a process that provides a service in response to information received over the Internet. For example, server host 582 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 582 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment may be implemented. Chip set 600 is programmed to determine safety levels for one or more travel links based, at least in part, on signage information as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of determining safety levels for one or more travel links based, at least in part, on signage information.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors. The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to determine safety levels for one or more travel links based, at least in part, on signage information. The memory 605 also stores the data associated with or generated by the execution of the inventive steps.

Figure 7:
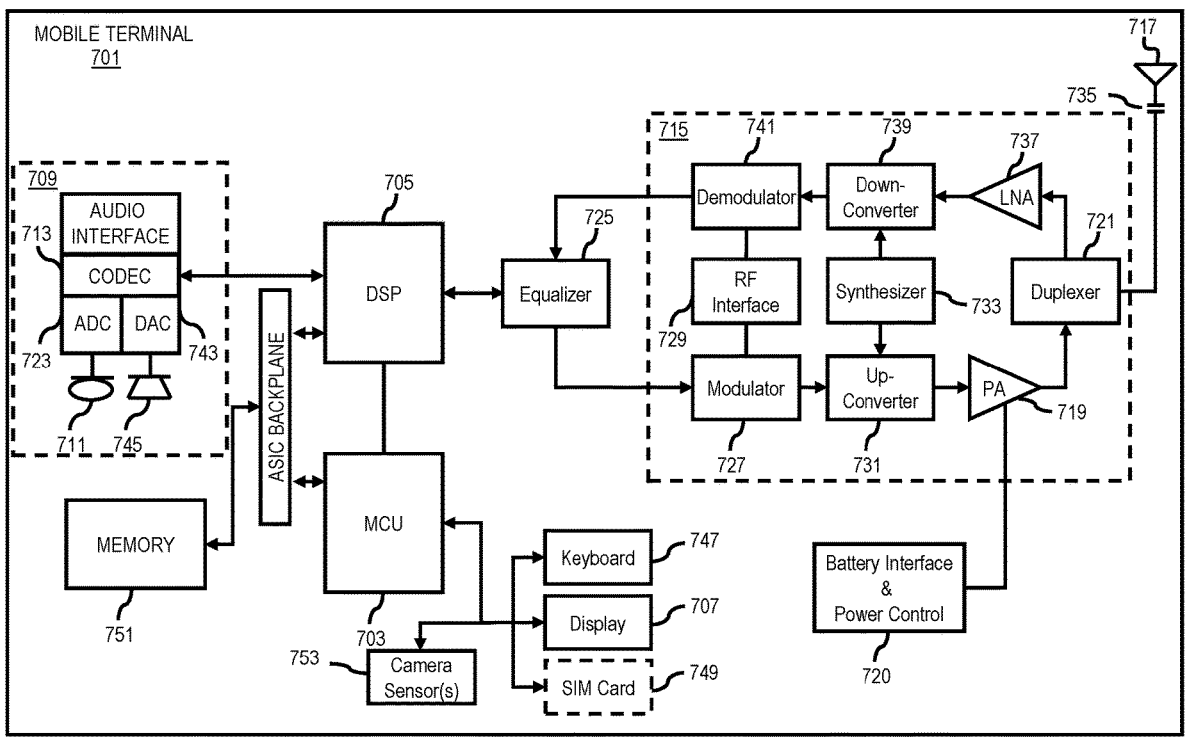
FIG. 7 illustrates a diagram of exemplary components of a mobile terminal for communications, which is capable of operating in the system of FIG. 1A.

FIG. 7 is a diagram of exemplary components of a mobile terminal 701 (e.g., a mobile device or vehicle or part thereof) for communications, which is capable of operating in the system of FIG. 1A, according to one embodiment. In some embodiments, mobile terminal 701, or a portion thereof, constitutes a means for performing one or more steps of determining safety levels for one or more travel links based, at least in part, on signage information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of determining safety levels for one or more travel links based, at least in part, on signage information. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to determine safety levels for one or more travel links based, at least in part, on signage information. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

Further, one or more camera sensors 753 may be incorporated onto the mobile station 701 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
    receive road observation data;
    determine whether the road observation data includes a timestamp indicating that one or more image sensors of a first vehicle observes a road sign over a period of which the first vehicle is within a predetermined distance from the road sign;
    responsive to the road observation data including the timestamp within the period, determine that the road sign is observed by the one or more image sensors;
    responsive to the road observation data not including the timestamp within the period, determine that the road sign is not observed by the one or more image sensors;
    responsive to determining that the road sign is not observed by the one or more image sensors, determine whether one or more second vehicles is obscuring the road sign;
    responsive to determining that the one or more second vehicles is not obscuring the road sign, determine whether the road sign is obscured due to a weather condition by using sensor data acquired from one or more non-image based sensors of the first vehicle; and
    responsive to the road sign being obscured due to the weather condition, generate a signal indicating that the road sign was obscured due to the weather condition.

2. The apparatus of claim 1, wherein the one or more non-image based sensors is one or more of wiper blade status sensors, one or more of external temperature sensors, or a combination thereof.

3. The apparatus of claim 2, wherein the instructions are configured to, when executed, cause the apparatus to determine that the road sign is obscured due to the weather condition in response to: (1) the one or more external temperature sensors indicating a temperature lower than a threshold temperature; (2) the one or more of wiper blade status sensors indicating activation of one or more wiper blades of the first vehicle; or (3) a combination thereof.

4. The apparatus of claim 1, wherein the instructions are configured to, when executed, cause the apparatus to, responsive to generating the signal, update a map to indicate that the road sign was obscured due to the weather condition using the signal.

5. The apparatus of claim 1, wherein the instructions are configured to, when executed, cause the apparatus to generate a confidence of obscureness based on the signal, the confidence of obscureness indicating a confidence level of which the road sign is obscured due to the weather condition.

6. The apparatus of claim 1, wherein the period includes one or more time points in which the first vehicle has passed the road sign.

7. A method of deducing a state of visibility of a road sign, the method comprising:
    receiving road observation data from a first sensor of a plurality of sensors associated with a first vehicle, wherein the first sensor is an image sensor;
    determining whether the road observation data includes a timestamp indicating that the first sensor observes the road sign over a period of which the first vehicle is within a predetermined distance from the road sign;
    responsive to the road observation data including the timestamp within the period, determining that the road sign is observed by the first sensor;
    responsive to the road observation data not including the timestamp within the period, determining that the road sign is not observed by the first sensor
    responsive to determining that the road sign is not observed, determining whether one or more second vehicles is obscuring the road sign using the road observation data;
    responsive to determining that the one or more second vehicles is not obscuring the road sign, determining whether a second sensor of the plurality of sensors generates readings indicating a weather condition, wherein the second sensor is a non-image based sensor; and
    responsive to the one or more second sensors generating the readings, generating, using a processor, a signal indicating that the road sign was obscured due to the weather condition.

8. The method of claim 7, wherein the non-image based sensor is a wiper blade status sensor, an external temperature sensor, or a combination thereof.

9. The method of claim 8, wherein the readings are defined by: (1) the external temperature sensor indicating a temperature lower than a threshold temperature; (2) the wiper blade status sensor indicating activation of one or more wiper blades of the first vehicle; or (3) a combination thereof.

10. The method of claim 7 further comprising, responsive to generating the signal, updating a map to indicate that the road sign was obscured due to the weather condition using the signal.

11. The method of claim 7 further comprising, generating a confidence of obscureness based on the signal, the confidence of obscureness indicating a confidence level of which the road sign is obscured due to the weather condition.

12. A non-transitory computer-readable storage medium having computer program code instructions stored therein, the computer program code instructions, when executed by at least one processor, cause the at least one processor to:

for each of one or more first vehicles:
  receive road observation data;
  determine whether the road observation data includes a timestamp indicating that an image sensor of the first vehicle observes the road sign over a period of which the first vehicle is within a predetermined distance from a road sign;
  responsive to the road observation data including the timestamp within the period, determine that the road sign is observed by the image sensor;
  responsive to the road observation data not including the timestamp within the period, determine that the road sign is not observed by the image sensor;
  responsive to determining that the road sign is not observed by the image sensor, determine whether one or more second vehicles are obscuring the road sign;
  responsive to determining that the one or more second vehicles are not obscuring the road sign, determine whether the road sign is obscured due to a weather condition by using sensor data acquired from a non-image based sensor of the first vehicle; and
  responsive to the road sign being obscured due to the weather condition, generate a signal indicating that the road sign was obscured due to the weather condition; and based on the one or more signals, generate a confidence of obscureness, the confidence of obscureness indicating a confidence level of which the road sign is obscured due to the weather condition.

13. The non-transitory computer-readable storage medium of claim 12, wherein the non-image based sensor is a wiper blade status sensor, an external temperature sensor, or a combination thereof.

14. The non-transitory computer-readable storage medium of claim 13, wherein the computer program code instructions, when executed by the at least one processor, cause the at least one processor to determine that the road sign is obscured due to the weather condition in response to: (1) the external temperature sensor indicating a temperature lower than a threshold temperature; (2) the wiper blade status sensor indicating activation of a wiper blade of the first vehicle; or (3) a combination thereof.

15. The non-transitory computer-readable storage medium of claim 12, wherein the instructions, when executed by at least one processor, causes the at least one processor to, responsive to the generation of the one or more signals, update a map to indicate that the road sign was obscured due to the weather condition using the one or more signals.

* * * * *